US006411053B1

(12) United States Patent
Dewey

(10) Patent No.: US 6,411,053 B1
(45) Date of Patent: Jun. 25, 2002

(54) ELECTRICAL SYSTEM

(75) Inventor: Ian Dewey, Bournemouth (GB)

(73) Assignee: Penny & Giles Drives Technology Limited, Dorset (GB)

( * ) Notice: Subject to any disclaimer, the term of this patent is extended or adjusted under 35 U.S.C. 154(b) by 0 days.

(21) Appl. No.: 09/669,925

(22) Filed: Sep. 26, 2000

(51) Int. Cl.$^7$ .............. G05B 5/00; H02H 7/08; H02P 1/00; H02P 3/00; H02P 7/00

(52) U.S. Cl. .......... 318/445; 307/9.1; 307/130; 361/31

(58) Field of Search ............... 318/445–466, 318/600; 323/283; 361/31, 93; 307/31, 20, 11, 33, 130, 10.1, 9.1, 18, 139, 87, 140, 71; 395/282, 283; 439/59, 34, 321; 324/402

(56) References Cited

U.S. PATENT DOCUMENTS

| | | | | |
|---|---|---|---|---|
| 4,063,365 A | * | 12/1977 | Hopkins et al. ............... 33/288 |
| 4,507,720 A | * | 3/1985 | Colbrese ....................... 363/13 |
| 4,996,477 A | * | 2/1991 | Keeler et al. ................ 324/158 |
| 5,034,727 A | * | 7/1991 | Muraoka ..................... 340/652 |
| 5,158,473 A | * | 10/1992 | Takahashi et al. .......... 439/353 |
| 5,160,852 A | * | 11/1992 | Charles et al. ................ 307/77 |
| 5,245,219 A | * | 9/1993 | Romatzick, Jr. et al. ...... 307/71 |
| 5,302,857 A | * | 4/1994 | Charles et al. ................ 307/20 |
| 5,309,073 A | * | 5/1994 | Kaneko et al. ............. 318/500 |
| 5,395,257 A | | 3/1995 | Lein ........................... 439/108 |
| 5,452,201 A | * | 9/1995 | Pieronek et al. ............ 364/188 |
| 5,491,418 A | * | 2/1996 | Alfaro et al. ................ 324/402 |
| 5,493,468 A | * | 2/1996 | Hunter et al. .................. 361/31 |
| 5,506,485 A | * | 4/1996 | Mueller et al. ............. 318/600 |
| 5,536,173 A | * | 7/1996 | Fujitani et al. ............... 439/34 |
| 5,802,328 A | * | 9/1998 | Yoshimura ................... 395/282 |
| 5,895,989 A | * | 4/1999 | Imaizumi et al. ........... 307/139 |
| 5,990,573 A | * | 11/1999 | Granitz et al. ............. 307/10.1 |
| 6,054,846 A | * | 4/2000 | Castleman ................... 323/283 |

FOREIGN PATENT DOCUMENTS

| | | | |
|---|---|---|---|
| JP | 7-39012 | * | 2/1995 |
| JP | 9-163510 | * | 6/1997 |
| JP | 2000-51213 | * | 2/2000 |
| JP | 2000-311038 | * | 11/2000 |

\* cited by examiner

*Primary Examiner*—Jeffrey Donels
(74) *Attorney, Agent, or Firm*—David P. Gordon; David S. Jacobson; Thomas A Gallagher

(57) ABSTRACT

An electrical system, such as a motor control system for a motorized wheelchair, includes a two-part electrical connector which connects a first sub-system to a second sub-system. A reference terminal of one part of the connector is connected to a voltage detecting circuit but is otherwise unconnected: in the event of the connector terminals corroding, a conductive path develops between the reference terminal and one of the other, active terminals and the voltage detecting circuit detects the resulting change in voltage at the reference terminal.

14 Claims, 2 Drawing Sheets

ELECTRICAL SYSTEM

BACKGROUND OF THE INVENTION

1. Field of the Invention

The present invention relates to electrical systems in which first and second sub-systems are connected together via an electrical connector assembly.

2. State of the Art

In such systems, use is made, in a wide range of applications, of an electrical connector assembly which comprises first and second parts having complementary, interengaged terminals.

A drawback of such connector assemblies is that conduction can easily occur between adjacent terminals of one or other of the two connector parts, for example due to corrosion of the terminals where they are exposed to atmospheric conditions. In many safety-critical applications, such conduction may have catastrophic effects: one such application is where the connector assembly is used between the electrical drive motor of a motorised wheel chair, and an electrical controller for the motor.

SUMMARY OF THE INVENTION

In accordance with the present invention, there is provided an electrical system comprising:

a) first electrical means and second electrical means;

b) an electrical connector assembly comprising first and second connector parts, said first connector part having first and second terminals and said second connector part having at least a first terminal which is complementary with and interengaged with said first terminal of said first connector part;

c) an electrical conductor extending from said first electrical means to said first terminal of said first connector part and an electrical conductor extending from said first terminal of said second connector part to said second electrical means; and d) a voltage detecting means;

said second terminal of said first connector part being connected to said voltage detecting means and said voltage detecting means detecting a change in voltage at said second terminal caused by a change in conduction between said second terminal and said first terminal of said first connector part, said second terminal of said first connector part being otherwise unconnected.

The above-mentioned second terminal of the first connector part is free apart from its connection to the voltage detecting means. Thus, in the event that the terminals start to corrode and a conductive path is developed between the first and second terminals of the first connector part, the voltage detecting means will detect a change in voltage on the second terminal.

Preferably the voltage detecting means comprises means for detecting an increase in voltage of more than a predetermined amount.

The voltage detecting means may instead comprise means for detecting a decrease in voltage of more than a predetermined amount.

Preferably the voltage detecting means comprises means to provide an alarm when the voltage change exceeds said predetermined amount.

BRIEF DESCRIPTION OF THE DRAWINGS

An embodiment of the present invention will now be described by way of example only and with reference to the accompanying drawings.

DETAILED DESCRIPTION OF THE PREFERRED EMBODIMENT

Figure 1:
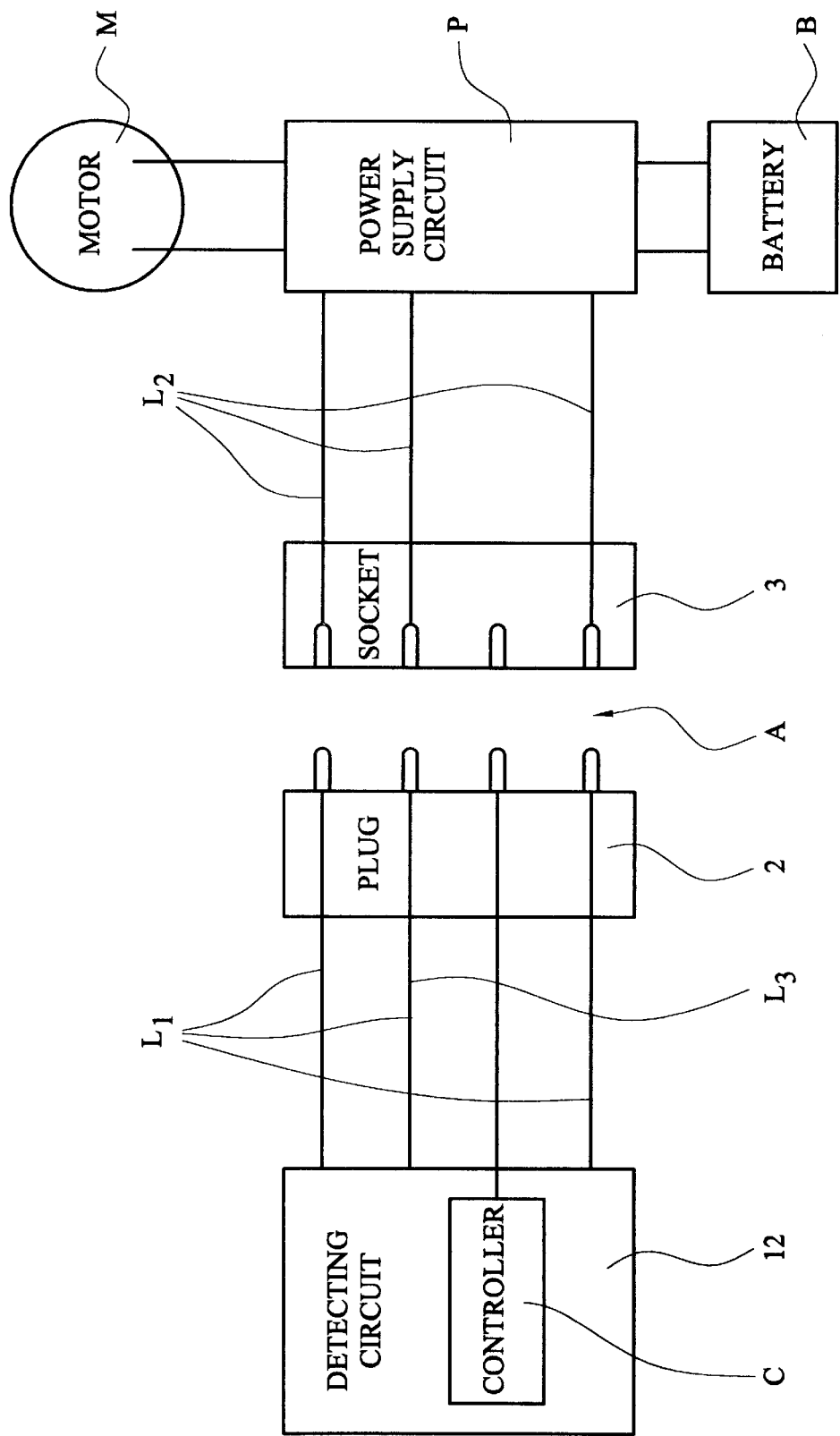
FIG. 1 is a schematic diagram of an electrical system in accordance with the invention.

Referring to FIG. 1 of the drawings, there is shown an electrical system for a motorised wheelchair. The wheelchair is driven by an electric motor M which receives power from an on-board battery B via a power supply circuit P. The system further comprises a controller C, operable by the user to control the circuit P and so control the speed of the motor M: the controller C is connected to the circuit P over successive sets of conductors $L_1$, $L_2$ via a connector assembly A which comprises two parts 2,3.

Figure 2:
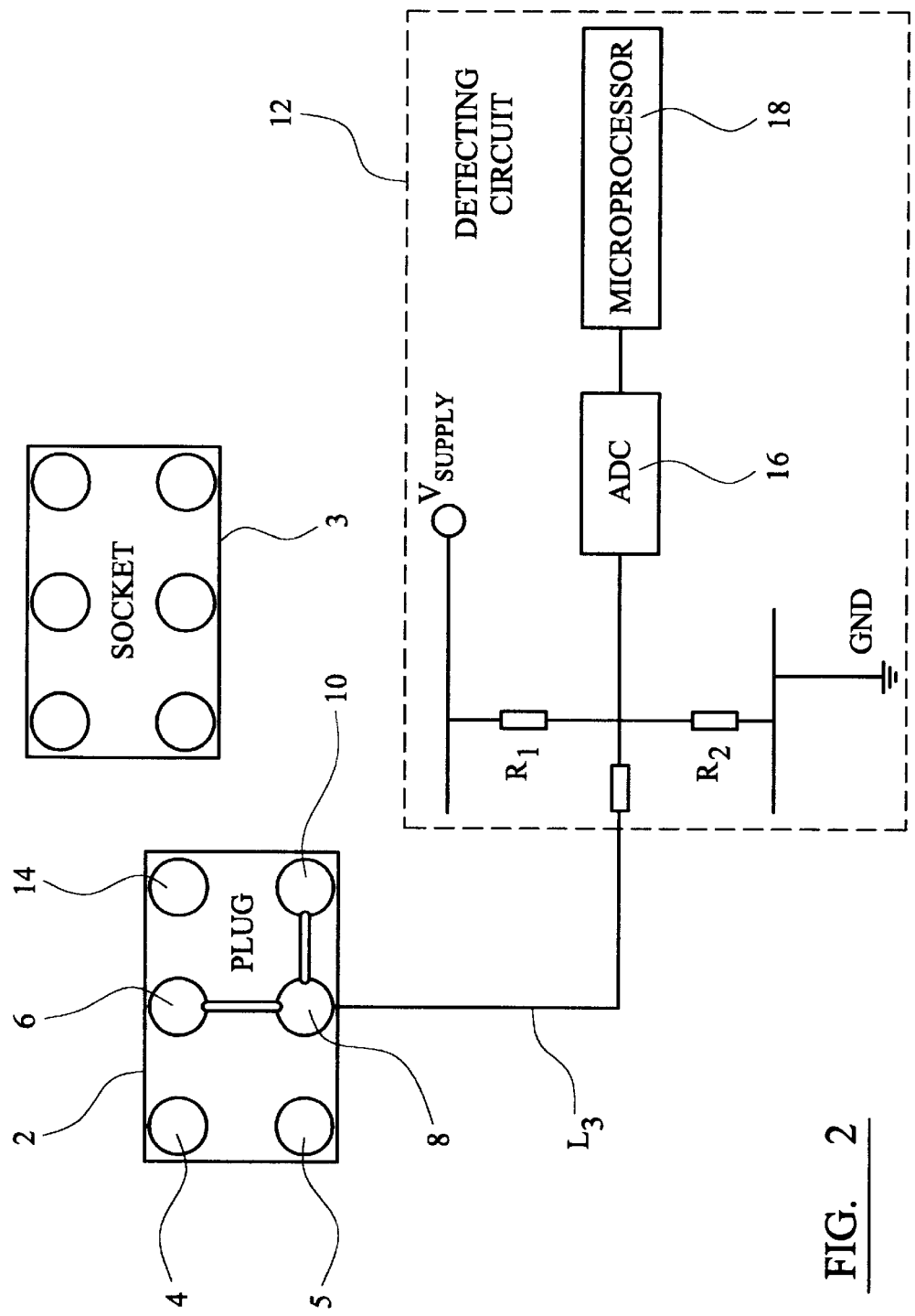
FIG. 2 is a schematic diagram showing an electrical connector assembly, and associated voltage detecting means, of the electrical system of FIG. 1.

Part 2 of the electrical connector assembly is in the form of a plug having a plurality of terminal pins arranged in two parallel lines of three pins each, see pins 4,6,14 and 5,8,10 in FIG. 2. Part 3 of the connector assembly is in the form of a socket for receiving the plug part 2, and has a plurality of terminal sockets to receive the respective pins of the plug part 2.

Pin 14, at one end of the plug part 2, receives a speed-demand signal from the controller C over one of the conductors LL: the corresponding socket terminal of the plus part 3 is connected by the corresponding line $L_2$ to the power supply circuit P. The two pins 4,5, at the opposite end of the plus part 2, are also connected to the controller C over respective conductors $L_1$ and the corresponding socket terminals of the plug part 3 are connected by corresponding conductors $L_2$ to the circuit P. The proximal ends of terminal pins 6,8 and 10 are connected together and are connected by a further conductor $L_3$ to a voltage detecting circuit 12 provided in or adjacent the controller C: the pins 6,8,10 thus isolate the pin 14 from the remaining pins 4,5. The pins 6,8 and 10 are otherwise free or unused, as they are not connected to any other circuit: in particular, whilst the pins 6,8 and 10 are received by complementary sockets of the socket part 3 of the connector assembly, these particular sockets do not have any conductors terminated to them. In a modification, the socket part 3 of the connector assembly may be devoid of electrical terminals to mate with the pins 6,8,10.

The detecting circuit 12 comprises a pair of resistors R1 and R2 which form a potential divider circuit between a positive voltage supply Vsupply and ground GND. The resistors R1 and R2 are chosen to provide the detecting circuit with a relatively high input impedance, so that conduction between the pin 14 of connector part 2 and any one of the three pins 6,8,10 will draw the voltage at the input to the detecting circuit away from its normal voltage (determined by the values of the two resistors R1 and R2) and towards the voltage at the pin 14.

The output of the potential divider circuit is fed to an analogue-to-digital converter 16 which produces a digital output representing the voltage at the pins 6,8,10. A microprocessor 18 processes the digital output of the analogue-to-digital converter to produce an alarm signal when the input voltage varies to more than a predetermined amount.

The arrangement thus described provides a simple yet effective safeguard against failure of the electrical system due to conduction between adjacent terminals of the connector assembly.

What is claimed is:

1. An electrical system comprising:
    a) first electrical means and second electrical means;
    b) an electrical connector assembly comprising first and second connector parts, said first connector part having first and second terminals and said second connector part having first and second terminals which are complementary with and interengaged with said first and second terminals of said first connector part;
    c) an electrical conductor extending from said first electrical means to said first terminal of said first connector part and an electrical conductor extending from said first terminal of said second connector part to said second electrical means; and
    d) a voltage detecting means, said second terminal of said first connector part being connected to said voltage detecting means and said voltage detecting means detecting a change in voltage at said second terminal caused by conduction between said second terminal and said first terminal of said first connector part, said second terminal of said second connector part having no external electrical connection thereto other than via said second terminal of said first connector part.

2. An electrical system as claimed in claim 1, in which said first connector part includes at least one further terminal connected to said second terminal, said further terminal also being otherwise unconnected.

3. An electrical system as claimed in claim 1, in which said first connected part includes at least one additional terminal complementary with and interengaged with additional terminals of said second connector part, said second terminal and further terminal of said first connector part serving to isolate said first terminal of said first connector part from said additional terminals of said first connector part.

4. An electrical system as claimed in claim 1, in which said voltage detecting means comprises means for detecting an increase in voltage, on said second terminal of said first connector part, of more than a predetermined amount.

5. An electrical system as claimed in claim 4, in which said voltage detecting means comprises means to provide an alarm when said voltage change exceeds said predetermined amount.

6. An electrical system as claimed in claim 1, in which said voltage detecting means comprises means for detecting a decrease in voltage, on said second terminal of said first connector part, of more than a predetermined amount.

7. An electrical system as claimed in claim 6, in which said voltage detecting means comprises means to provide an alarm when said voltage change exceeds said predetermined amount.

8. An electrical system as claimed in claim 1, in which said voltage detecting means comprises means for holding said second terminal of said first connector part at a predetermined voltage.

9. An electrical system as claimed in claim 1, in which said voltage detecting means comprises an analogue-to-digital converter connected to said second terminal of said first connector part to product a digital output representing the voltage at said terminal, and a microprocessor for processing said digital output to detect said change in voltage.

10. An electrical system as claimed in claim 1, in which said terminals of said first connector part comprise pins received in complementary sockets of said second connector part.

11. An electrical system as claimed in claim 2, in which said first electrical means comprises a controller and said second electrical means comprises an electric motor controlled by said controller.

12. An electrical system as claimed in claim 11, in which said electrical conductors carry a speed-demand signal from said controller to said electric motor.

13. An electrical connector for connecting to a mating electrical connector, said electrical connector comprising:
    a) a first terminal;
    b) a second terminal;
    c) a voltage detection circuit means coupled to said first terminal for detecting a change in voltage at said first terminal caused by a change in conduction between said first and second terminals; and
    d) a third terminal, said first terminal being located between said second and third terminals and isolating said second terminal from said third terminal.

14. An electrical connector according to claim 13, wherein:
    said first terminal comprised a plurality of terminals electrically coupled to each other and isolating said second terminal from said third terminal.

* * * * *

UNITED STATES PATENT AND TRADEMARK OFFICE
Certificate

Patent No. 6,411,053 B1                                                                                    Patented: June 25, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ian Dewey, Bournemouth, United Kingdom; and Stephen A. Nesmith, San Dimas, CA.

Signed and Sealed this Thirteenth Day of December 2005.

*DAVID MARTIN*
*Supervisory Patent Examiner*
*Art Unit 2837*